United States Patent [19]
Shakespear et al.

[11] 3,835,757
[45] Sept. 17, 1974

[54] VEHICLE BODY CONSTRUCTION
[75] Inventors: Horacio Shakespear, West Bloomfield; James A. Steele, Birmingham, both of Mich.
[73] Assignee: General Motors Corporation, Detroit, Mich.
[22] Filed: Mar. 5, 1973
[21] Appl. No.: 338,308

[52] U.S. Cl. .................................................. 98/2
[51] Int. Cl. ............................................. B60h 1/24
[58] Field of Search .............. 98/2, 2.04, 2.08, 2.18, 98/2.19; 296/146

[56] References Cited
UNITED STATES PATENTS

| | | |
|---|---|---|
| 2,150,110 | 3/1939 | Streuss ................................ 98/2.04 |
| 2,523,923 | 9/1950 | Rodent ............................... 98/2.04 |
| 2,728,284 | 12/1955 | Hott .................................... 98/2.06 |
| 2,820,523 | 1/1958 | Earl ..................................... 98/2.06 |
| 3,602,126 | 8/1971 | Breitschwerdt .......................... 98/2 |
| 3,715,966 | 2/1973 | Miettinen ............................ 98/2.18 |

*Primary Examiner*—Meyer Perlin
*Attorney, Agent, or Firm*—Saul Schwartz

[57] ABSTRACT

A body construction wherein vehicle structural, fresh air ventilation, heating, and side window defrosting are performed by a single element. In particular, a side guard beam rigidly disposed on the door of the vehicle defines a closed conduit. Fresh air intake louvers on a rear frame portion of a window opening in the door convey fresh air from outside the vehicle into the closed conduit which then conveys the fresh air to the interior of the vehicle through a plurality of ducts. Also, heated air from the vehicle's heater is conveyed to the closed conduit which then transmits the heated air to either the interior of the vehicle and/or the side windows through a plurality of adjustable diffusers. Concurrently, in the closed position of the door, the beam functions to maintain the integrity of the passenger compartment against side impact loading.

2 Claims, 5 Drawing Figures

PATENTED SEP 17 1974 3,835,757

VEHICLE BODY CONSTRUCTION

This invention relates generally to vehicle body constructions and more particularly to a construction wherein a structural element of the vehicle body portion functions also as part of the vehicle's ventilating system.

In the automobile industry, engineers and designers continuously attempt to reduce the cost of the vehicles they design without sacrificing any performance or dependability or, alternatively, to improve the vehicle without adding to the cost thereof. One way this object is achieved is by combining two or more functions into a single element thereby avoiding the expense of redundant elements while possibly increasing the useable space available in the vehicle. A vehicle body construction according to this invention represents an improvement over heretofore known body constructions in that it combines structural and body ventilation functions into a single element.

The primary feature, then, of this invention is that it provides an improved vehicle body construction. Another feature of this invention is that it provides an improved vehicle body construction wherein a single element functions in both structural and body ventilation modes. Yet another feature of this invention is that it provides an improved vehicle body construction wherein a side guard beam disposed on the door of the vehicle for maintaining passenger compartment integrity in the event of a side impact defines a closed conduit which conveys fresh air from outside the vehicle into the interior of the body portion thereof. A further feature of this invention resides in the provision of an intake duct and an adjustable shield associated therewith which functions to control the quantity of fresh air admitted into the side guard beam. A still further feature of this invention resides in the provision on the door of the vehicle of a window opening defined in part by a rear frame portion which frame portion functions as the fresh air intake for conveying fresh air into the side guard beam. These and other features of this invention will be readily apparent from the following specification and from the drawings wherein:

Figure 1:
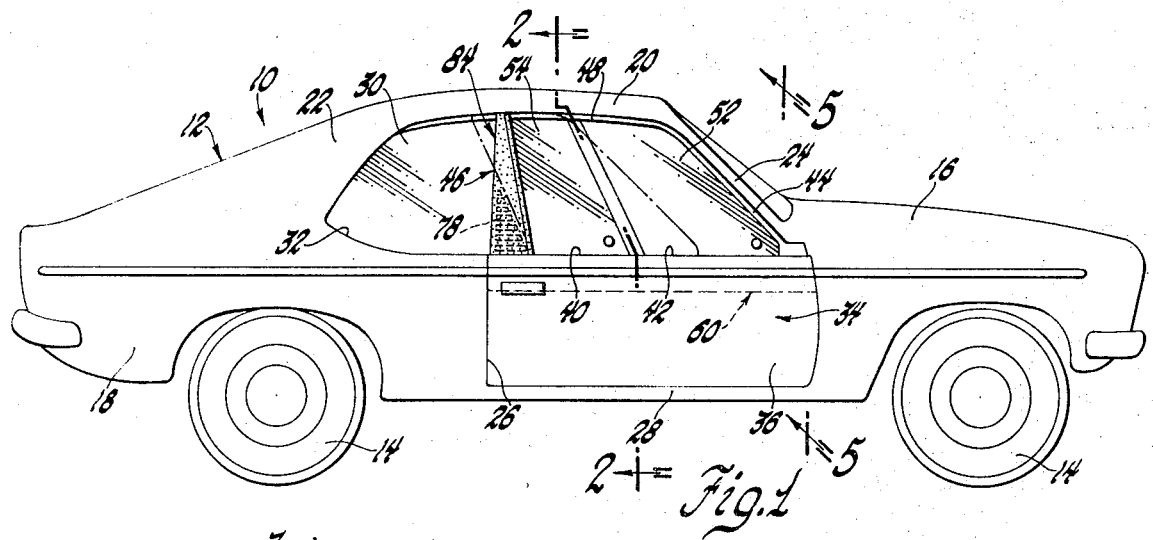
FIG. 1 is a side elevational view of an automobile type vehicle incorporating a body construction according to this invention.

Referring now to the drawings, FIG. 1 depicts an automobile type vehicle designated generally 10 including a body portion 12. Typically, the body portion 12 is connected through conventional mountings to a frame or chassis, not shown, on which are rotatably supported a plurality of road wheels 14. Alternatively, of course, the body portion 12 may be of the unitized construction type wherein the frame and body portion are integral and the road wheels are attached directly to the body portion through any conventional suspension arrangement. The body portion 12 includes a front fender and hood assembly 16, a rear quarter panel assembly 18, and a roof structure 20 connected to the rear quarter panel assembly 18 through a sail panel 22. The forward end of the roof structure 20 is supported by a front or A pillar 24 disposed between the roof structure and the front fender and hood assembly 16. The vehicle body 12, of course, includes an interior portion for accommodating an operator and several passengers, access to the interior being had through a door opening 26 defined, in part, by the rear quarter panel assembly 18, the front fender and hood assembly 16, and a rocker panel 28 extending between the rear quarter panel and the front fender and hood assemblies.

The door opening 26 extends substantially the full height of the body portion 12 with generally the lower half of the opening being defined by the rear quarter panel and the front fender and hood assemblies and the upper half of the opening being defined by the A pillar 24, the roof structure 20, and a glass panel 30 disposed in a rear window opening 32 defined by the roof structure 20, the sail panel 22, and the rear quarter panel assembly 18. The door opening 26 is adapted to be selectively closed by a door 34 disposed on the body portion 12 for pivotal or swinging movement about a vertical axis located generally adjacent the forward end of the door opening between an open position, not shown, exposing the door opening and a closed position, FIG. 1, in the door opening.

Figure 2:
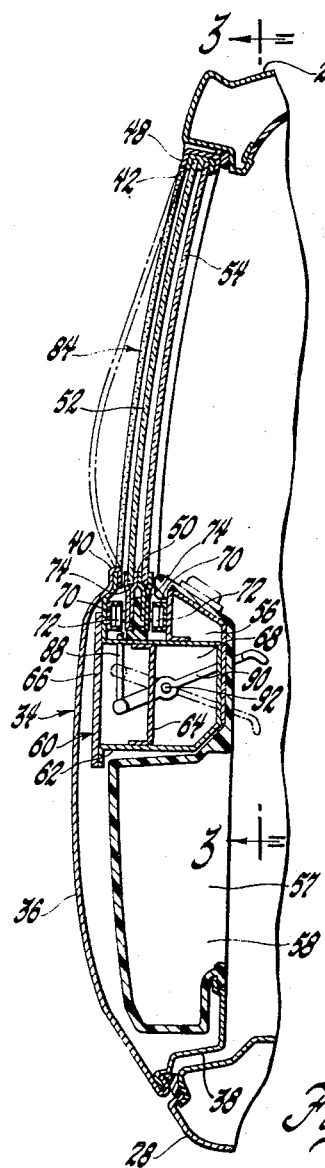
FIG. 2 is an enlarged sectional view taken generally along the plane indicated by lines 2—2 in FIG. 1.
Figure 3:
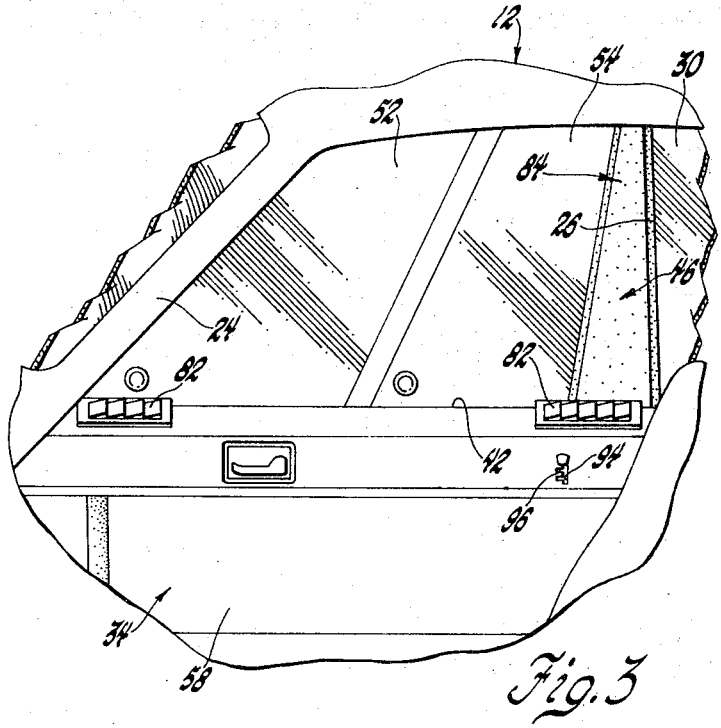
FIG. 3 is a fragmentary view taken generally along the plane indicated by lines 3—3 in FIG. 2.
Figure 4:
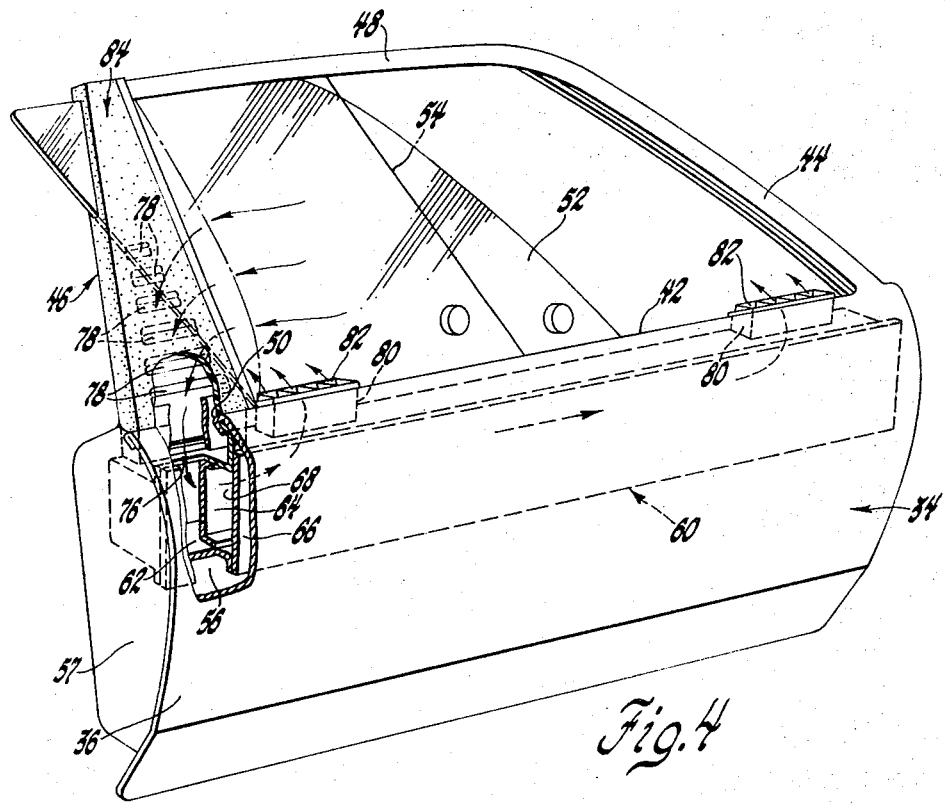
FIG. 4 is an enlarged perspective view of a vehicle door constructed according to this invention.

As seen best in FIGS. 2 and 4, the door 34 includes an outer panel 36 and an inner panel 38 hem flanged to the outer panel generally around the entire periphery of the latter except at the edges of the panels aligned at the belt line 40 of the body portion 12. Above the belt line 40, the door 34 further includes a window opening 42 defined at the front by a front frame portion 44, at the rear by a rear frame portion 46, at the top by an upper frame portion 48, and at the bottom by an elongated aperture 50 between the outer panel 36 and the inner panel 38. As described more fully hereinafter, the door 34 has supported thereon within the window opening 42 a front glass panel 52 and a rear glass panel 54, the front and rear panels being bodily shiftable longitudinally of the door between respective closed positions, FIGS. 3 and 5, wherein the panels cooperate in completely closing the window opening and respective ones of a pair of open positions wherein one or the other of the panels is shifted forwardly or rearwardly to expose the corresponding portion of the window opening, the open position of front panel 52 being shown in FIGS. 4 and 5.

Referring again to FIGS. 2 and 4, the inner panel 38 is relatively closely spaced inboard of the outer panel 36 but includes a section which extends further inboard to define a rectangular, longitudinally extending cavity 56 generally at the belt line 40 of the body portion 12. The section of the inner panel 38 defining the cavity 56 cooperates with a lower inturned section of the inner panel and with a pair of end sections, only end section 57 being shown in FIG. 4, in defining an article storage pocket 58 in the door which pocket is readily accessible from the interior of the body portion. Within the cavity 56, the door 34 has rigidly supported thereon a composite side guard beam assembly 60, the beam assembly extending generally the entire length of the door. The beam assembly 60 is a structural element of the body portion 12 and functions to maintain the integrity of the interior or passenger compartment of the body portion in the event of a side impact on the vehicle. Accordingly, in the closed position of the door, FIG. 1, the beam assembly is typically anchored to the quarter panel assembly 18 through a conventional door latch arrangement, not shown, and to the front fender and hood assembly 16 through conventional bracing or by being directly hinged to the fender and hood assembly. The beam 60, therefore, forms an integral part of the door 34 and is, of course, swingable as a unit therewith between the open and closed positions.

Figure 5:
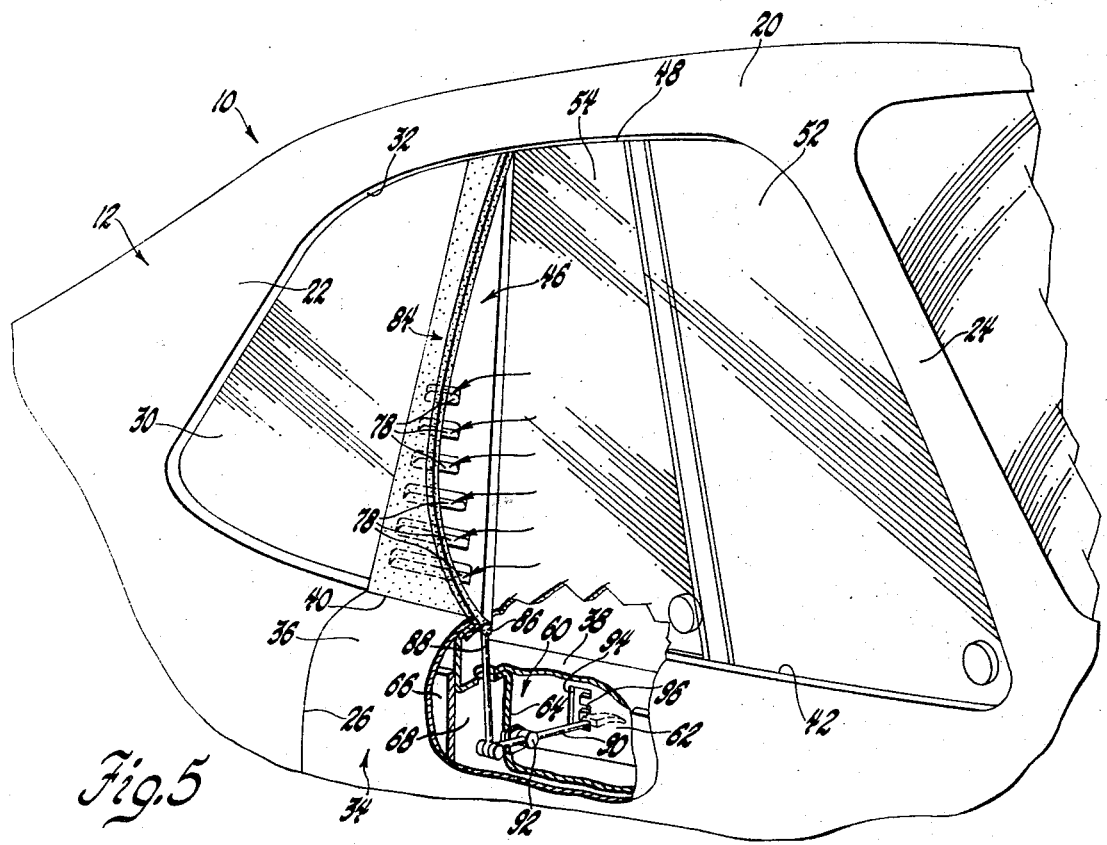
FIG. 5 is a fragmentary perspective view taken generally along the plane indicated by lines 5—5 in FIG. 1.

Referring now to FIGS. 2, 4 and 5, the beam assembly 60 includes a deep section channel 62, a shallow section channel 64 disposed within the channel 62 and rigidly attached thereto, and an end reinforcing plate 66 which sealingly closes the open side of the deep section channel 62. The channel 62 cooperates with the plate 66 in defining a closed conduit 68 which extends generally the entire length of the door 34.

As seen best in FIG. 2, the deep section channel 62 rigidly supports a pair of cam channels 70 which guidingly receive a plurality of rollers 72. The rollers are connected to a corresponding pair of carriers 74 attached to the lower marginal edges of respective ones of the front and rear glass panels 52 and 54. The rollers support the glass panels on the door 34 in the window opening 42 for bodily shiftable movement as described hereinbefore. For a more detailed description of the window installation, reference may be made to the copending application of Horacio Shakespear, Ser. No. 309,195, assigned to the assignee of this invention.

Referring particularly to FIGS. 4 and 5 now, the closed conduit 68 defined by the composite beam assembly 60 communicates with the hollow interior of the rear frame portion 46 through an aperture 76 in the uppermost flange of the deep section channel 62. The outermost or outboard surface of the rear frame portion 46 includes a plurality of louvers 78 which provide communication between the interior of the rear frame portion and the atmosphere surrounding the vehicle. Accordingly, the rear frame portion 46 defines an intake duct for conveying outside or fresh air into the closed conduit 68.

As best seen in FIGS. 3 and 4, the uppermost flange of the deep section channel 62 includes a pair of apertures into which are fitted a corresponding pair of ventilator ducts 80, the ducts extending from the deep section channel and through the inner panel 38. The ducts 80 are covered by a plurality of airflow directing louvers 82. The composite beam assembly 60, thus, functions to convey fresh air from outside the vehicle to the interior thereof through the rear frame portion 46, the closed conduit 68, and the ducts 80. Of course, the louvers 82 can be either fixed or movable to direct the air to any desired area of the interior of the body portion 12.

A body construction according to this invention further provides for regulating the intake of fresh air through the louvers 78 on the rear frame portion 46. More particularly, a generally triangularly shaped flexible cover 84 is rigidly attached to the outermost surface of the rear frame portion 46 along the rear marginal edges of the cover and the rear frame portion as well as the top of the latter. Along the lower marginal edge of the cover 84 the latter has attached thereto a rigid reinforcing bar 86 which, in turn, is attached to a connecting rod 88. The free end of the rod 88 is pivotally attached to a lever 90 supported on the shallow section channel 64 at 92 for pivotal movement between a raised position and a lowered position, shown respectively in solid and broken lines in FIG. 2.

Pivotal movement of the lever 90, of course, effects vertical reciprocation of the rod 88 which, in turn, effects pivotal movement of the reinforcing bar 86 about a transverse axis located generally at the base of the rear marginal edge of the cover 84 where the latter is attached to the rear frame portion. As the reinforcing bar 86 pivots generally in the plane of the outboard surface of the rear frame portion, the front edge of the cover 84 is caused to bow outwardly from a generally flat fully closed configuration, FIG. 3, to a fully open configuration, shown in FIG. 5 and in broken lines in FIG. 2. In the fully closed configuration, the cover completely seals the louvers 78 on the rear frame portion thereby to prevent fresh air from entering the closed conduit 68 and the interior of the body portion. In the fully open configuration, however, the cover defines a scoop for funneling fresh air into the louvers 78. The cover, in any intermediate position between the fully open and fully closed configurations, functions to regulate the amount of fresh air delivered to the louvers 78.

For maintaining a plurality of open settings of the cover 84, the inner panel 38 of the door has formed therein a slot 94 having a plurality of horizontal notches 96. The lever 90 projects through the composite beam assembly 60 and the slot 94 into the interior of the body portion and is adapted to move vertically in the slot for regulating the fresh air intake. To maintain a particular open setting of the cover 84, the rod 90 is shiftable longitudinally into one of the horizontal notches 96 wherein further vertical movement of the lever is foreclosed.

In a modified embodiment, not shown, the composite beam assembly can function as a conduit for conveying heated air and as a defroster for the glass panels 52 and 54. More particularly, by providing a pair of registering ports in the forward end of the composite beam assembly and in the forward edge of the door opening 26, a duct from the heater unit of the vehicle can be adapted to convey heated fresh air through the registered ports into the closed conduit when the door 34 is closed. The heated air can then, of course, be directed either toward the interior of the vehicle or against the windows to provide defrosting.

Having thus described the invention, what is claimed is:

1. In a vehicle including a body portion having a door opening therein and a door disposed thereon for pivotal movement into and out of a closed position in said door opening, the combination comprising, a beam member defining a closed conduit and exhibiting substantial rigidity in a simple beam loading mode, means supporting said beam member on said door for movement as a unit therewith, said beam member spanning generally the full width of said door, means on said body portion and on said door adapted for rigidly connecting said beam member to said body portion in the closed position of said door for maintaining passenger compartment integrity against side impact loading, means on said door defining an intake duct for a quantity of outside air, means on said door connecting said intake duct and said closed conduit for conveying said outside air into said closed conduit, means on said beam member defining a duct between said closed conduit and the interior of said body portion for exhausting said outside air from said closed conduit into the interior of said body portion, and means on said door for regulating the quantity of said outside air entering said intake duct.

2. In a vehicle including a body portion having a door opening therein and a door disposed thereon for pivotal movement into and out of a closed position in said door opening, said door including a window opening defined in part by a front frame portion and a rear frame portion, the combination comprising, a beam member defining a closed conduit and exhibiting substantial rigidity in a simple beam loading mode, means supporting said beam member on said door for movement as a unit therewith, said beam member spanning generally the full width of said door, means on said body portion and on said door adapted for rigidly connecting said beam member to said body portion in the closed position of said door for maintaining passenger compartment integrity against side impact loading, means on said door defining an intake duct within said rear frame portion, means on said rear frame portion defining a plurality of intake ports for admitting a quantity of outside air into said intake duct, a flexible cover disposed on said rear frame portion for movement between an open position exposing said intake ports and defining an air scoop therefore and a closed position closing said intake ports, manual control means on said door adapted for moving said cover between the open and the closed positions, means on said door connecting said intake duct and said closed conduit for conveying said outside air from said intake duct into said closed conduit, and means on said beam member defining a plurality of selectively closeable ducts between said closed conduit and the interior of said body portion for conveying said outside air from said closed conduit into the interior of said body portion.

* * * * *